United States Patent
Kotagiri et al.

(10) Patent No.: US 8,831,142 B2
(45) Date of Patent: Sep. 9, 2014

(54) ADAPTIVE CANCELLATION OF VOLTAGE OFFSET IN A COMMUNICATION SYSTEM

(71) Applicant: LSI Corporation, Milpitas, CA (US)

(72) Inventors: Shiva Prasad Kotagiri, Campbell, CA (US); Pervez M. Aziz, Dallas, TX (US); Amaresh V. Malipatil, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/717,973

(22) Filed: Dec. 18, 2012

(65) Prior Publication Data

US 2014/0169440 A1  Jun. 19, 2014

(51) Int. Cl.
*H04L 27/00* (2006.01)
*H04L 27/01* (2006.01)

(52) U.S. Cl.
CPC ............ *H04L 27/01* (2013.01); *H04L 27/0002* (2013.01)
USPC ........... 375/316; 375/229; 375/232; 375/233; 375/234; 375/346; 375/348

(58) Field of Classification Search
USPC .......... 375/316, 229, 232, 233, 234, 346, 348
See application file for complete search history.

(56) References Cited

U.S. PATENT DOCUMENTS

| | | | |
|---|---|---|---|
| 7,277,516 B2 * | 10/2007 | Chou et al. | 375/350 |
| 7,425,907 B1 * | 9/2008 | Chaichanavong et al. | 341/59 |
| 8,139,457 B2 | 3/2012 | Cao et al. | |
| 8,194,792 B2 | 6/2012 | Aziz et al. | |
| 8,446,941 B2 * | 5/2013 | Yang | 375/233 |
| 2003/0027610 A1 * | 2/2003 | Loke | 455/575 |
| 2007/0216562 A1 | 9/2007 | Teo et al. | |
| 2010/0026350 A1 * | 2/2010 | Ozawa | 327/141 |
| 2010/0254711 A1 | 10/2010 | Miller | |
| 2011/0274154 A1 | 11/2011 | Aziz et al. | |
| 2012/0086494 A1 * | 4/2012 | Asada et al. | 327/307 |

OTHER PUBLICATIONS

European Patent Application by Chou, Ger-Chih, EP 1898582 A1, published on Mar. 12, 2008.*
Qianqian, Lei et al.; A programmable gain amplifier with a DC offset calibration loop for a direct-conversion WLAN transceiver; Journal of Semiconductors; Apr. 2011; vol. 32; No. 4.
LSI Patentability Search Report for L12-0971, Feb. 12, 2010.

* cited by examiner

*Primary Examiner* — Siu Lee

(57) ABSTRACT

Described embodiments include a receiver for a serial-deserializer or the like. The receiver has adaptive offset voltage compensation capability. The offset voltage is canceled by a controller in a feedback loop to generate a compensation signal depending on a data decision error signal or by timing signals used for clock recovery.

15 Claims, 3 Drawing Sheets

100

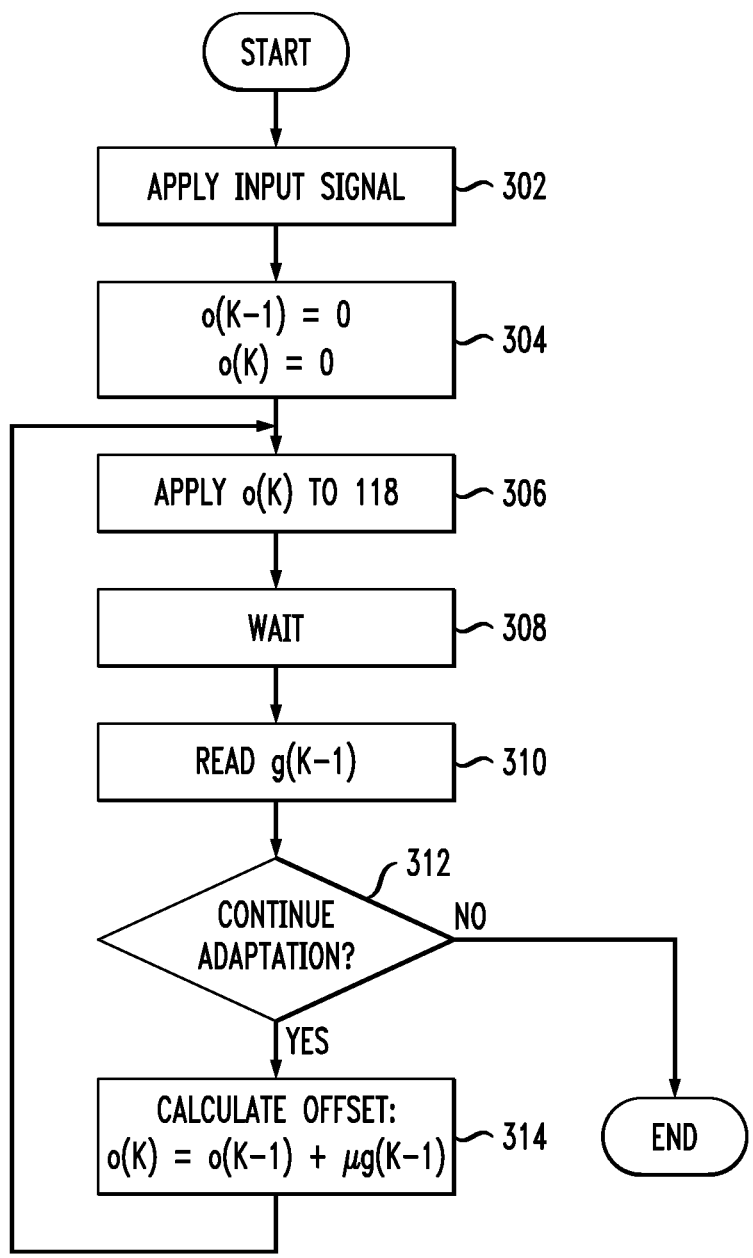

ADAPTIVE CANCELLATION OF VOLTAGE OFFSET IN A COMMUNICATION SYSTEM

CROSS-REFERENCE TO RELATED APPLICATIONS

The subject matter of this application is related to U.S. patent application Ser. No. 13/231,097 filed on Sep. 13, 2011 and Ser. No. 13/315,831 filed on Dec. 9, 2011, the teachings of which are incorporated herein in their entireties by reference.

BACKGROUND

In many data communication applications, serializer and de-serializer (SERDES) devices facilitate the transmission of parallel data between two points across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and with temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization of the signal at a receiver.

Equalization through use of one or more equalizers compensates for the signal degradation to improve communication quality. Equalization might also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. Equalization might be through a front-end equalizer, a feedback equalizer, or some combination of both. The shape of the data eye also changes due to equalization applied to input signal of the receiver. In some systems, equalization applied by a transmitter's equalizer further alters the shape of the eye from the ideal.

If an analog front-end equalizer (AFE) is employed, the data eye-operating margin improves. However, better performance might be achieved through use of at least one of a Decision Feedback Equalizer (DFE) and a feed forward equalizer (FFE) in combination with an AFE. The DFE might be employed to optimize for post-cursor intersymbol interference (ISI) and the FFE might be employed to reduce pre-cursor ISI. Use of a DFE and/or an FFE might open the vertical and horizontal data eye opening.

Differential signaling is widely used signaling in SERDES systems. In differential signaling, two complimentary signals are sent on two separate wires and the difference between the two signals is determined at the receiver. In an ideal situation, the circuitry handling the two complimentary signals are perfectly matched to avoid introducing an additional, or offset, voltage between the differential signals. In reality, however, there is typically a mismatch between the devices used in the circuitry and the AFE circuit's themselves typically introduce an unknown and relatively slowly varying offset voltage into the differential signals. Unfortunately, the offset voltage can degrade the noise margin of the system. Since the offset voltage is generally a slowly varying signal, its frequency content is typically concentrated near DC. Further, the offset voltage varies with process, voltage, and temperature (PVT) variations of the SERDES system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The described embodiments provide a receiver having an input, an analog front end, a first subtractor, and a slicer. The analog front end is coupled to the receiver input and has an output. The first subtractor has an output and has a first input coupled to the output of the analog front end. The slicer has an output and has an input coupled to the output of the first subtractor.

In one embodiment, the receiver has a multiplier, a second subtractor, and an offset adaptation controller. The multiplier, has an output, a first input coupled to the output of the slicer, and a second input adapted to receive a weighting factor. The second subtractor, having an output, has a first input coupled to the output of the multiplier, and a second input coupled to the input of the slicer. The offset adaptation controller has an input coupled to the output of the second subtractor and is configured to produce at an output a voltage coupled to a second input of the first subtractor.

In another embodiment, the receiver has a sampler and an offset adaptation controller. The sampler has an input coupled to the output of the first subtractor, an output, and is configured to sample signals applied thereto at transitions in those signals. The offset adaptation controller has an input coupled to the output of the sampler and is configured to produce at an output a voltage coupled to a second input of the first subtractor.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

FIG. 3 illustrates an exemplary process for cancelling offset voltage in the embodiments of FIGS. 1 and 2.

DETAILED DESCRIPTION

Figure 1:
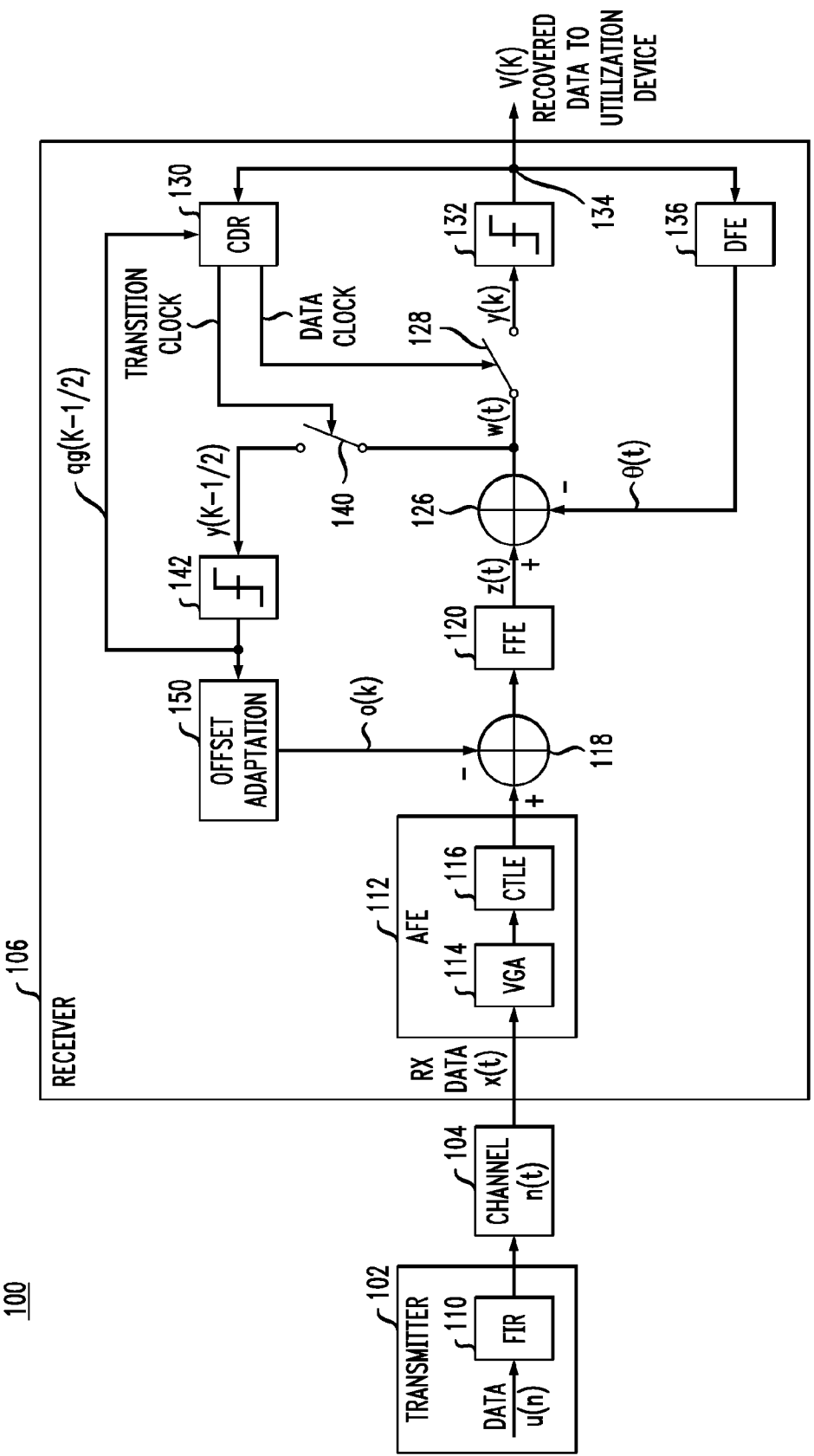
FIG. 1 shows a high level block diagram of a SERDES communication system according to exemplary embodiments of the invention.

Table 1 summarizes a list of acronyms employed throughout this specification as an aid to understanding the described embodiments of the invention:

TABLE 1

| | | | |
|---|---|---|---|
| ADC | Analog to Digital Converter | AEQ | Analog Equalizer |
| | | BER | Bit Error Rate |
| AFE | Analog Front End | DBE | Digital Back End |
| CDR | Clock and Data Recovery | DSP | Digital Signal Processing |
| DFE | Decision Feedback Equalizer | FIR | Finite Impulse Response |
| | | ISI | Intersymbol Interference |
| FFE | Feed Forward Equalizer | PAM | Pulse Amplitude Modulation |
| IC | Integrated Circuit | | |
| NRZ | Non-Return to Zero | RF | Radio Frequency |
| PVT | Process, Voltage, Temperature | | |
| RX | Receive | SERDES | Serializer-Deserializer |
| SoC | System on Chip | UI | Unit Interval |
| CTLE | Continuous-Time Linear Equalizer | VGA | Variable Gain Amplifier |

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

FIG. 1 shows a block diagram of an exemplary serializer-deserializer (SERDES) communication system 100 that might be implemented in an integrated circuit. As shown in FIG. 1, SERDES system 100 includes transmitter 102, communication channel 104, and receiver 106. As shown, transmitter 102 might optionally include finite impulse response (FIR) filter 110 for conditioning data before transmission to communication channel 104. In some embodiments, the function of FIR 110 might optionally be moved from transmitter 102 to receiver 106 as receive data. Transmitter 102 provides data u(n) as a transmit signal as serial data symbols via communication channel 104, to receiver 106. Due to the channel pulse response, h(t), of communication channel 104, the transmitted signal bits, u(n), are received by receiver 106 as receive data symbols, RX DATA x(t). Communication channel 104 might typically be a physical transmission medium, such as a backplane, drive head in a magnetic recording system, copper cables, or optical fibers.

Although described herein as being employed in a SERDES communication system, described embodiments are not so limited, and some embodiments might be employed in alternative communications systems employing a transmitter and a receiver communicating over a communication channel. The communication channel might be at least one of fiber optics, one or more coaxial cables, one or more twisted pair copper wires, and/or one or more radio frequency (RF) channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal encoding scheme might be employed.

After passing though communication channel 104, the analog transmit signal is filtered or equalized by analog front end (AFE) 112 of receiver 106. As shown in more detail in FIG. 2, AFE 112 comprises a conventional variable gain amplifier (VGA) 114 to amplify the received signal, and a continuous-time linear equalizer (CTLE) 116 coupled to the output of the VGA. An exemplary CTLE is described in U.S. patent application Ser. No. 13/244,985, titled "A Method of Compensating for Nonlinearity in a DEE-based Receiver", filed 26 Sep. 2011, incorporated by reference herein in its entirety.

The output of AFE 112 is provided to an analog summer 118, the purpose of which is described in more detail below, and the output of the summer 118 is provided to an optional feed forward equalizer (FFE) 120, employed to reduce precursor ISI in the received data symbols. FFE 120 applies equalization, in conjunction with a decision feedback equalizer (DFE) 136. The feedback signal from DFE 136, Θ(t), is subtracted from the filtered input signal z(t) by summer 126. DFE 136 is discussed in more detail below. Consequently, analog summer 126 provides compensated analog signals, w(t), that are applied to a sampler 128 that is clocked by a data clock signal from clock data recovery block 130. As will be explained in more detail below, the CDR 130 detects timing of the input data stream and uses such detected timing to set correct frequency and phase of two sampling clock signals, DATA CLOCK and TRANSITION CLOCK, based on the signals being received. The output samples y(k) from the sampler 128 are coupled to decision device (shown as data slicer 132) that, based on an input threshold, generates data decision bits v(k) corresponding to input symbols y(k). Data slicer 132 compares input samples in the analog domain to a threshold. Data slicer 132 might typically be implemented as a decision device based on an amplitude threshold, but might also be a more complicated detector such as a sequence detector. Data slicer 132 produces a binary version of w(k) or a quantized, multi-bit, value of w(k). Detected data v(k) is typically be provided to a utilization device (not shown), coupled to receiver 106, for further processing.

In one embodiment, the data slicer 132 essentially quantizes the signal w(k) to a binary "1" or "0" based on the sampled analog value and a slicer threshold, $s_t$. If the input to the slicer 132 at time k is $y_k$, then the detected data bit output, v(k) of the slicer 132 is given as follows:

$$v(k) = +1 \text{ (e.g., a binary ``1'') if } y_k > s_t \text{ and}$$
$$= -1 \text{ (e.g., a binary ``0'') otherwise.}$$

In this example, the slicer 132 has a slicer threshold $s_t$ of zero.

The DFE 136 is a conventional DFE and well known in the art. See, for example, U.S. Patent Application Publication 2011/0274154, titled "Compensated Phase Detector for Generating One or More Clock Signals Using DFE Detected Data in a Receiver" by P. M. Aziz et al., filed 10 May 2010, and incorporated by reference herein in its entirety, for one exemplary embodiment of a DFE and the description thereof. In general, the DFE is a multi-tap filter having L taps that generates the feedback signal, Θ(t), constructed based on an estimate of inter-symbol interference (ISI) present in input sample y(k). DFE 136 is employed to reduce post-cursor ISI in the received signal. DFE 136 generates the feedback signal based on one or more previous data decisions of data slicer 132 and one or more pulse response coefficients (taps) corresponding to the characteristics of the communication channel 104. The tap values are estimated and adapted by an adaption controller (not shown) based on error signal e(k) (not shown) generated from the difference between a weighted data decision v(k) and the corresponding sampled input symbol y(k). It is noted that the DFE equalizer described herein is well known and considered an analog implementation because compensation is done in the analog domain even though part of the equalizer might be implemented in digital form.

Exemplary operation of L-tap DFE 136 in FIG. 1 is as follows. A DFE correction signal, Θ(t), generated by a DFE filter 136 is subtracted by an analog summer 126 from the output, z(t), of the AFE 112 to produce a DFE corrected signal w(t), where w(t)=z(t)−Θ(t). Then the DFE-corrected signal w(t) is then sampled by sampler 128 and quantized by slicer 132 to produce the detected data bits v(k).

Because the output of slicer 132 (the detected data bits v(k)) is used by filter 136 to produce the DFE output Θ(t), the filter 136 uses past corrected detected data to produce the DFE output Θ(t). For one embodiment of the filter 136, the output of the DFE filter 136 is:

$$\Theta(t) = \sum_{i=1}^{L} h(i)v(-i)$$

where h(i) represents the coefficients or weights of the L-tap DFE filter 136 and v(−i) represents past data decisions from the slicer 132. Further explanation of the filter 136 and alternative embodiments thereof may be found in the above-mentioned U.S. Patent Application Publication 2011/0274154. The value of the tap weights h(i) is determined during a training period by analyzing an error signal, not shown, described in more detail below in connection with FIG. 2. Generally and as well understood in the art, the above-mentioned adaptation controller (not shown) coupled to the DFE 136 varies the tap weights using an exemplary least-mean-squared (LMS) algorithm to minimize the error signal. Alternatively, other iterative adaptation algorithms may be used.

The signal w(t) from the output of summer 126 is also sampled by sampler 140 in response to the TRANSITION CLOCK from CDR 130 to produce samples y(k−½). The transition sample data is denoted as y(k−½) to indicate is sampled relative to y(k) by a phase offset of T/2, where T is the baud rate of the received symbols. The sampling at input symbol transitions, preferably after being quantized by slicer 142, advantageously allows the CDR 130 to better lock onto the phase of the incoming symbols.

The function of the CDR 130 is provide the clocks to the samplers 128 and 140 so that when the input symbols are sampled by sampler 128 and passed to slicer 132, the data is recovered properly despite the fact that the phase and frequency of the transmitted signal is not known. The CDR 130 is often an adaptive feedback circuit and the feedback loop must adjust the phase and frequency of the nominal clock to produce a modified recovered clock that can sample the analog waveform to allow proper data detection. In general, the CDR 130 is typically composed of several components, such as a phase detector, a loop filter, and a clock generation circuit. The phase detector may be implemented as a bang-bang phase detector. For a general discussion of bang-bang phase detectors, see, for example, J. D. H. Alexander, "Clock Recovery from Random Binary Signals," Electronics Letters, 541-42 (October, 1975), incorporated by reference herein in its entirety. For other implementations adaptable for use as CDR 130, see "Method and Apparatus for Generating One or More Clock Signals for a Decision-Feedback Equalizer Using DFE Detected Data", by Aziz et al., U.S. Pat. No. 7,616,686, incorporated by reference herein in its entirety, and "Look-Ahead Digital Loop Filter for Clock and Data Recovery", by Aziz et al. U.S. Pat. No. 8,194,792, also incorporated by reference herein in its entirety.

Output from the sampler 140 is quantized by slicer 142 and the quantized data qy(k−½) is used by the above-described CDR 130 and an offset adaptation block 150. As will be explained in more detail below, the offset adaptation block 150 generates an offset correction voltage or sample o(k), using an adaptation loop process, that is applied to the negative input of summer 118. The summer 118 subtracts the offset correction voltage o(k) from the symbols passed by the AFE 112 to at least partially cancel any offset voltage in the symbols w(t) before they are sampled by the sampler 128.

Figure 2:
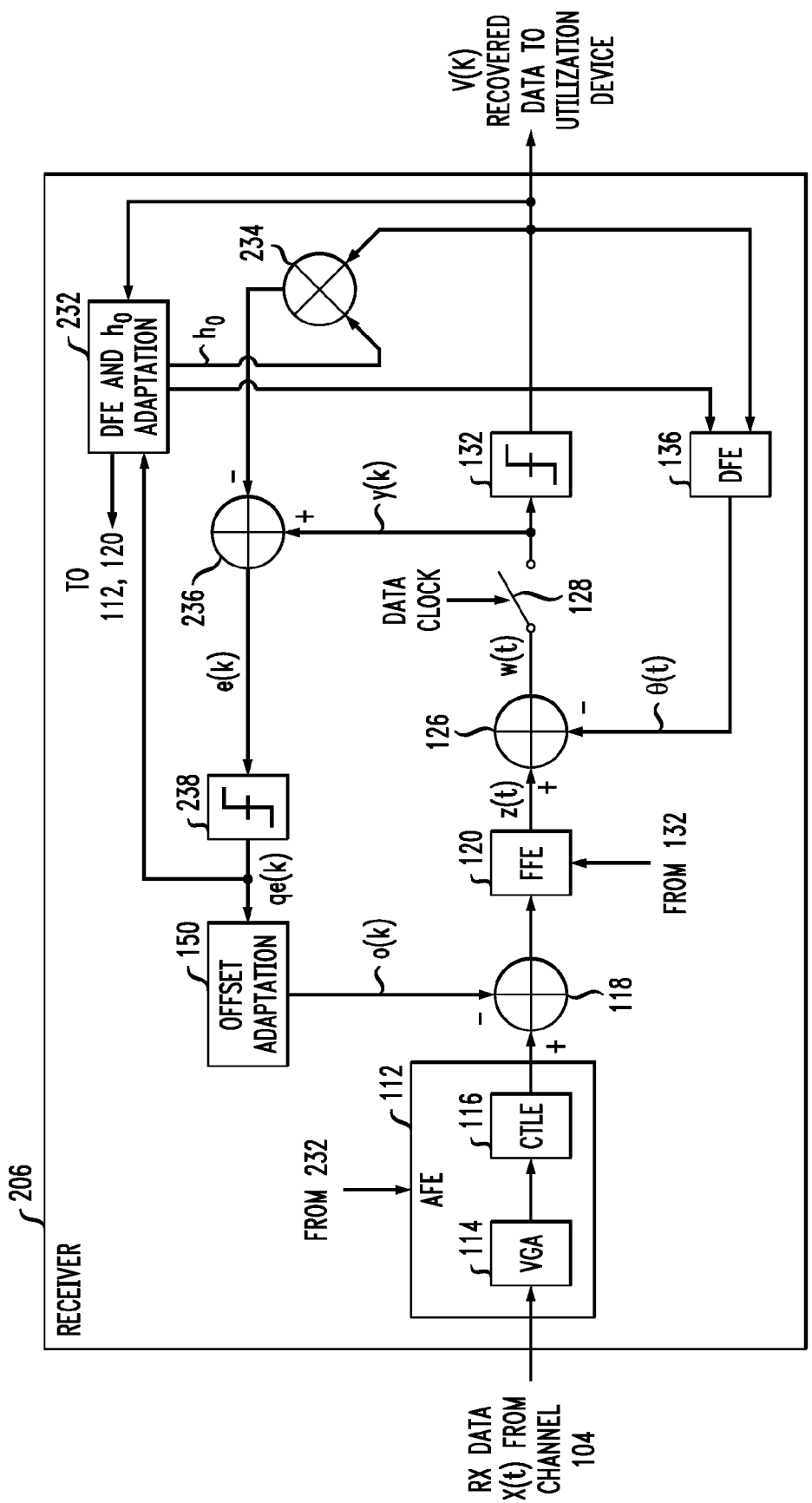
FIG. 2 shows a high level block diagram of a SERDES receiver, similar to that in FIG. 1, according to other embodiments of the invention.

FIG. 2 illustrates another embodiment of the invention. Receiver 206 is similar to receiver 106 of FIG. 1 except that instead of offset adaptation based on the transition sample data y(k−½) in FIG. 1, an error signal representing, the difference between the DFE-corrected signal y(k) and detected data bits v(k) from slicer 132, weighted with a channel estimate $h_0$, is used by offset adaptation block 150. Operation of the various blocks in FIG. 2 is substantially the same as described above for identically numbered blocks in FIG. 1.

A clock and data recovery unit (not shown), similar to CDR 130 in FIG. 4, generates the clock signals necessary for receiver 206 to operate.

As mentioned above in connection with FIG. 1, an adaptation controller, here a conventional DFE and $h_0$ adaptation controller 232, adjusts the value of the tap weights h(i) determined during a training period by analyzing a quantized error signal qe(k). Generally and as well understood in the art, the DFE and $h_0$ adaptation controller 232 coupled to the DFE 136 varies the tap weight values thereof using an exemplary leastmean-squared (LMS) algorithm to minimize the error signal. Alternatively, other iterative adaptation algorithms may be used.

As in FIG. 11, data decisions v(k) are provided to DFE 132, which generates a feedback signal, z(k), constructed based on an estimate of inter-symbol interference (ISI) present in input sample y(k). DFE 132, using a tapped filter with coefficients determined by DFE and $h_0$ adaptation controller 232, generates equalized output based on one or more previous data decisions of data slicer 132. The tap coefficients correspond to one or more pulse response coefficients of the communication channel 104. The DFE and $h_0$ controller 232 adapts based on a quantized version of an error signal e(k) generated from the difference between a weighted data decision v(k) and the corresponding input sample y(k). Weighting coefficient $h_0$ from the controller 232 is based on an estimate of the first coefficient of the transfer function of channel 104. For purposes here, $h_0$ is proportional to the amplitude of the received signals from the channel 104. The weighted data decisions are generated by multiplier 234, and error signal e(k) is generated as the difference between the weighted decision $h_0$v(k) and the input sample y(k) by subtractor 236. The error signal e(k) might also be employed by the above-described CDR circuitry (not shown) for timing recovery. The error signal e(k) is quantized by slicer 238 to produce quantized error signal qe(k) that is applied to DFE adaptation controller 232 to update and adapt parameters of the various filters (coefficients and taps) of AFE 112, FFE 120 if present, and DFE 132. The slicer 238 operates substantially the same as slicer 132 and has approximately the same threshold voltage.

Offset adaptation block 150 receives the quantized error signal qe(k) to determine the offset o(k) applied to subtractor 118. Alternatively, when the offset adaptation block 150 and DFE adaptation block 232 are implemented in analog form, the offset adaptation block 150 receives the error signal e(k) instead of the quantized version. In another embodiment, the offset adaptation block 150 is implemented in or by the DFE and $h_0$ adaptation controller 232. However, the offset adaptation adaption process described below can be implemented independently of the DFE adaptation processes undertaken by the controller 232.

As shown in FIGS. 1 and 2, the receiver 106, 206 consists of analog front-end (AFE) that typically consists of analog circuits such as VGA 114 and CTLE 116 which respectively amplify and equalize the signal input to the receiver. These circuits might introduce unknown and relatively slowly varying offset into the signal it process which causes the AFE output to shift up or down based on the polarity of the AFE offset voltage. There might be other sources that result in voltage offset as seen by the slicer 132, such as the transmitter 102 and the channel 104.

For purposes of this description, the input signals and signals z(t), w(t), θ(t), and y(k) are bipolar signals, e.g., ranging between +1 and −1. Similarly, the recovered data bits v(k) have values of +1 and −1 depending on the value of the signal applied to slicer 132. However, other values may be used with a suitable adjustment to the offset correction technique described below.

In the offset correction technique implemented in offset adaptation block 150 in FIG. 1, either the transition samples y(k−½) or the quantized version of transition samples qy(k−½) is used to calculate the AFE offset voltage o(k). Alternatively and as shown in FIG. 2, either the error signal e(k) or the quantized (sliced) error signal qe(k) is used to calculate the AFE offset voltage. In both embodiments, the calculated offset voltage o(k) is subtracted from the AFE output signal to remove the effect of AFE offset voltage. In these embodiments, the offset voltage introduced by AFE 112 is adapted using transition or error samples according to minimum mean squared error (MMSE) criterion. The value of o(k) is computed as o(k)=o(k−1)+μg(k−1), where g(k−1) is a gradient with respect to the immediately preceding offset voltage o(k−1) according to the MMSE criteria and μ is a step size.

According to the MMSE criteria for the receiver 106 in FIG. 1, g(k−1) is given as either −y(k−½) or −qy(k−½) depending on the implementation of the receiver 106 in FIG. 1. Then the update equation of o(k) is given as either o(k)=o(k)+μy(k−½) or o(k)=o(k)+μqy(k−½). The average value of either bipolar symbols qy(k−½) or analog samples y(k−½) gives the direction/sign of the AFE offset voltage and the step size μ determines quantization level of corrected AFE offset voltage.

For the receiver 206 in FIG. 2, in one embodiment, the value of o(k) is also computed as o(k)=o(k−1)+μg(k−1), where g(k−1) is a gradient with respect to the immediately preceding offset voltage o(k−1) according to the MMSE criteria and μ is a step size. According to the MMSE criteria for the receiver 206 in FIG. 2, g(k−1) is given as either −e(k) or −qe(k) depending on the implementation of the receiver 206. Then the update equation of o(k) is given as either o(k)=o(k)+μe(k) or o(k)=o(k)+μqe(k). The average value of either bipolar symbols qe(k) or analog samples e(k) gives the direction/sign of the AFE offset voltage and the step size μ determines quantization level of corrected AFE offset voltage. The step size μ is dependent on the amount of offset range and number of intervals or steps the range is to be divided into. For example, if the offset ranges from −60 mV to +60 mV and the number of steps is 32, then μ is 120 mv/32 or 3.75 mV/step or 3.75 $10^{-3}$ V/step. The offset range and number of steps needed is system dependent but the expected range of μ is typically between $10^{-6}$ and $10^{-2}$ V/step.

For both embodiments, the AFE offset voltage o(k) is based on digital adaptation process using either transition samples or error samples to remove the impact of AFE offset voltage on the system 100.

FIG. 3 illustrates one embodiment of a digital adaptation process 300 to generate the offset voltage sample o(k). After an input signal is applied to the receives in step 302, the offset sample o(k) and a variable representing a previous offset sample, o(k−1), are initialized to zero or some other known value. Then in step 306 the offset set voltage sample o(k) is applied to the summer 118 to begin canceling any DC offset from the AFE 112 and any other analog circuitry the AFE couples to. After sufficient time for the system to adapt to the change in offset voltage in step 308, the gradient g(k−1) is read (here g(k−1) is either −y(k−½) or −qy(k−½) for the embodiment in FIG. 1 or is either −e(k) or −qe(k) for the embodiment in FIG. 2) in step 310. If the adoption process is to terminate because, for example, the gradient is less than a threshold value or enough time or adaptation cycles has occurred, the process ends with step 312. However, if the adaptation is to continue, then in step 314 the next offset voltage o(k) is calculated as described above and control passes back to step 306 for another cycle.

While embodiments have been described with respect to circuit functions, the embodiments of the present invention are not so limited. Possible implementations, either as a stand-alone SERDES or as a SERDES embedded with other circuit functions, may be embodied in a single integrated circuit, a multi-chip module, a single card, system-on-a-chip, or a multi-card circuit pack. As would be apparent to one skilled in the art, the various embodiments might also be implemented as part of a larger system. Such embodiments might be employed in conjunction with, for example, a digital signal processor, microcontroller, field-programmable gate array, application-specific integrated circuit, or general-purpose computer. As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be manifest in the form of a bitstream or other sequence of signal values electrically or optically transmitted through a medium, stored magnetic-field variations in a magnetic recording medium, etc., generated using a method and/or an apparatus as described herein.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

It is understood that embodiments of the invention are not limited to the described embodiments, and that various other embodiments within the scope of the following claims will be apparent to those skilled in the art.

The invention claimed is:

1. A receiver having an input, the receiver comprising:
   an analog front end coupled to the receiver input and having an output;
   a first subtractor having a first input coupled to the output of the analog front end and having an output;
   a second subtractor having a first input coupled to the output of the first subtractor, a second input, and an output;
   a first slicer having an input coupled to the output of the second subtractor and having an output;
   a first sampler having an input coupled to the output of the second subtractor, having an output, and configured to sample signals applied thereto at transitions in those signals;
   an offset adaptation controller having an input coupled to the output of the first sampler and configured to produce at an output a signal coupled to a second input of the first subtractor; and
   a decision feedback equalizer having an output coupled to the second input of the second subtractor, at least one tap coefficient, and an input coupled to the output of the first slicer.

2. The receiver of claim 1 further comprising a second sampler disposed between the output of the second subtractor and the input of the first slicer, wherein the second sampler is configured to sample signals applied thereto between transitions in those signals.

3. The receiver of claim 2 further comprising a second slicer having an input coupled to the output of the first sampler and having an output coupling to the input of the offset adaptation controller.

4. The receiver of claim 3 further comprising:
   a clock recovery circuit responsive to the output of the second slicer;
   wherein the clock recovery circuit controls the first and second samplers.

5. The receiver of claim 1 further comprising a feed forward equalizer disposed between the first subtractor and the second subtractor.

6. The receiver of claim 5 further comprising:
   a decision feedback equalizer adaptation controller coupled to the output of the first slicer;
   wherein the decision feedback equalizer adaptation controller controls the decision feedback equalizer, the feed forward equalizer, and the analog front end.

7. The receiver of claim 6 wherein the decision feedback equalizer adaptation controller and the offset adaptation controller are one controller.

8. The receiver of claim 1 wherein the offset adaptation controller is configured to perform the following steps:
   read the input of the offset adaptation controller to generate a gradient;
   calculate a offset value based on a past offset value adjusted by a combination of the gradient and a step size; and
   output to the output of the offset adaptation controller the calculated offset value.

9. The receiver of claim 8 wherein the steps are repeated.

10. The receiver of claim 8 wherein the analog front end has a DC offset and the step size is substantially determined by a range of the DC offset divided by a desired number of steps.

11. The receiver of claim 10 wherein the step size ranges from approximately $10^{-6}$ to approximately $10^{-2}$ V/step.

12. The receiver of claim 1 wherein the receiver is implemented in an integrated circuit.

13. In a system including a receiver, the receiver having an input and an analog front end coupled to the input, a method comprising:
   applying input signals to the receiver input;
   filtering the applied input signals with analog front-end circuitry;
   subtracting from the filtered input signals an offset cancelation value to form a compensated signal;
   subtracting from the compensated signal an equalized signal to form an intermediate signal;
   sampling, in response to a transition clock, the intermediate signal at transitions in the intermediate signal;
   calculating the offset cancelation value based on a past offset cancelation value adjusted by a combination of the intermediate signal sampled in response to the transition clock and a step size;
   sampling, in response to a data clock, the intermediate signal between transitions in the intermediate signal;
   slicing the intermediate signal sampled in response to the data clock to generate recovered data bits; and
   equalizing, using a decision feedback equalizer, the recovered data bits to form the equalized signal.

14. The method of claim 13 further comprising the step of:
   slicing the intermediate signal sampled in response to the transition clock;
   wherein the step of calculating the offset cancelation value is adjusted based on the sliced intermediate signal sampled in response to the transition clock.

15. The method of claim 6 further comprising:
   generating the data and transition clock signals in response to the recovered data bits and the sliced intermediate signal sampled in response to the transition clock.

* * * * *